United States Patent [19]
Blackwell et al.

[11] Patent Number: 5,365,545
[45] Date of Patent: Nov. 15, 1994

[54] MODEM-CHANNEL BANK CONVERTER

[75] Inventors: Steven R. Blackwell; Michael D. Fanning, both of Huntsville, Ala.

[73] Assignee: Universal Data Systems, Inc., Huntsville, Ala.

[21] Appl. No.: 873,320

[22] Filed: Apr. 24, 1992

[51] Int. Cl.[5] .............................................. H04B 1/38
[52] U.S. Cl. ........................................ 375/8; 375/121; 375/25; 370/84; 341/61
[58] Field of Search ................. 375/7, 8, 121, 27, 25; 370/84; 341/61; 364/724.1

[56] References Cited

U.S. PATENT DOCUMENTS

| | | | |
|---|---|---|---|
| 4,897,855 | 1/1990 | Acampora | 375/27 |
| 4,989,221 | 1/1991 | Qureshi et al. | 375/8 |
| 5,051,981 | 9/1991 | Kline | 375/8 |
| 5,199,046 | 3/1993 | Ling | 375/8 |

Primary Examiner—Curtis Kuntz
Assistant Examiner—Don N. Vo
Attorney, Agent, or Firm—Wayne J. Egan

[57] ABSTRACT

A converter (200) includes a transmit circuit that converts modem transmit samples at 9,600 samples/second into samples that may be transmitted by a T1 channel bank at 8,000 samples/second. The converter also includes a receive circuit that converts T1 channel bank receive samples at 8,000 samples/second into samples that may be received by a modem at 9,600 samples/second.

24 Claims, 2 Drawing Sheets

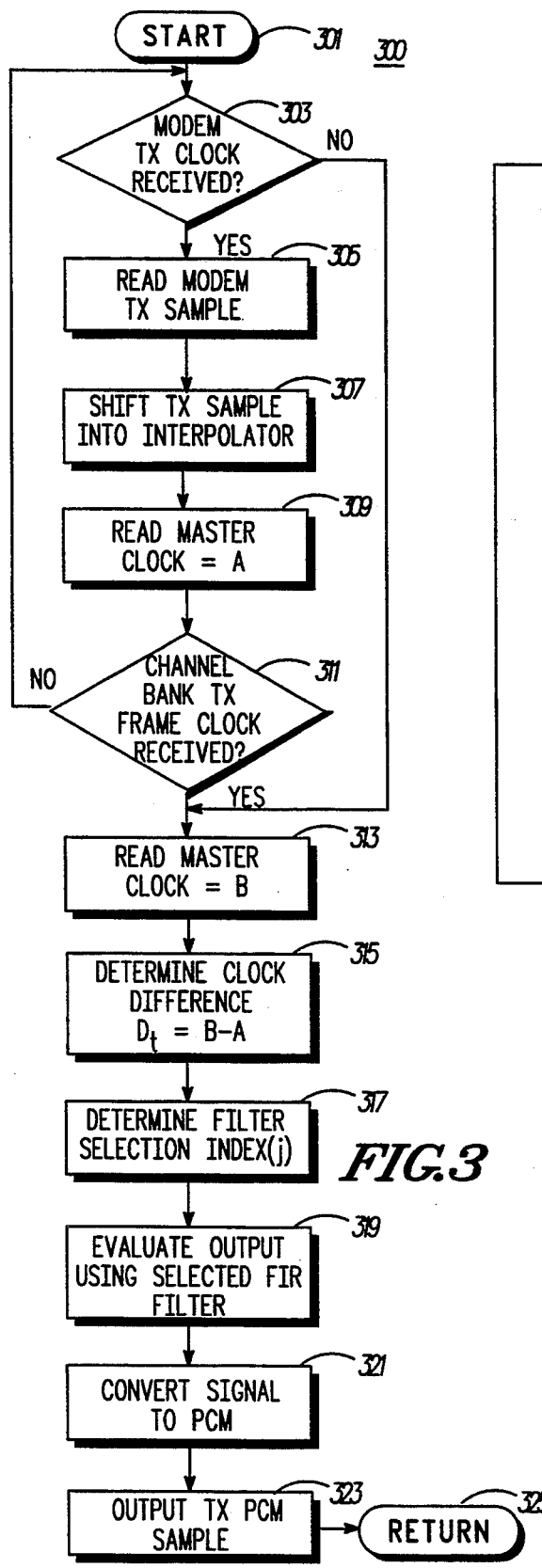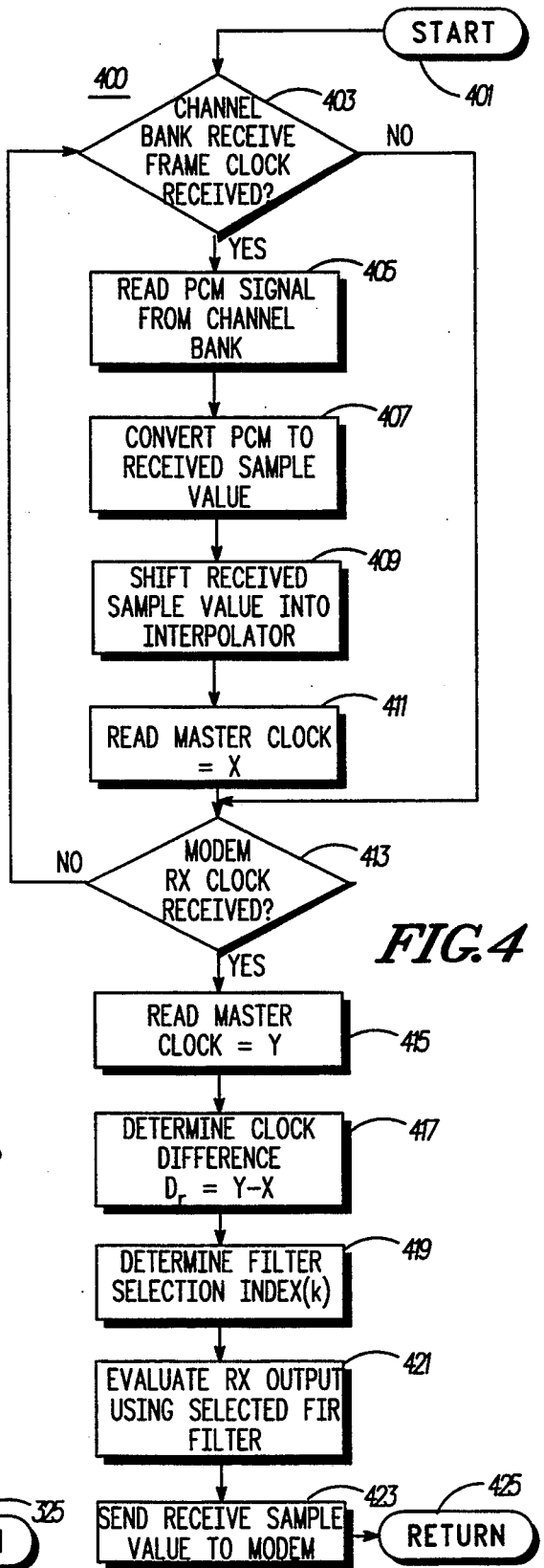
FIG.3
FIG.4

MODEM-CHANNEL BANK CONVERTER

FIELD OF THE INVENTION

This application relates to converters including, but not limited to, modem-channel bank converters.

BACKGROUND OF THE INVENTION

Presently, modems are used to transport digital data between data terminal equipment such as personal computers, workstations and the like, over channels, such as telephone lines. Typically, the communication signal includes digital data in the form of a carrier signal that is modulated by a predetermined transmit constellation of signal points. Each signal point of the transmit constellation represents a digital code or value to be transported. At the sending modem, a carrier signal is thus modulated at the constellation signal point corresponding to the digital code or value to be transported over the channel. At the receiving modem, the modulated carrier signal may include distortion and other impairments induced as a result of the transmission process. The carrier signal is removed, and a received signal point is then identified from a receive constellation. The digital code or value represented by the signal point may then be obtained from a memory device, such as a look-up table.

In the past, typically such modems have been used with voice-grade analog telephone lines. However, modern telephone networks are increasingly migrating from analog systems to digital systems. For instance, it is common for large telephone users to be served by a T1-carrier digital service. In fact, most telephone companies today not only offer such service, but encourage their larger customers to order this service.

As is known, present T1 systems are capable of providing a group of 24 digital channels to an end user, each channel consisting of a stream of 8-bit samples, each sample transported at 8,000 samples/second, in a telephone company-specified pulse code modulation ("PCM") format defined as "DS-0". This is roughly equivalent to 64,000 bits/second ("64 Kbps") per channel. Thus, it is possible for a customer to order a single T1 connection from, for instance, their premises to a telephone company-owned network switch for distribution of the 24 channels of 64 Kbps to other locations. This would allow a customer to connect to a telephone network switch with one T1-carrier and send calls to 24 different locations.

In this arrangement, each of the 24 channels could be digital data or voiceband analog signals in the DS-0 format. This method of access allows the customer to send the same amount of data over one pair of wires, namely, the T1 service, instead of 24 separate pairs. This provides a savings to the network provider and also to the customer. It also presents opportunities for innovations in equipment design, since a modem and a channel bank card can be replaced by a single card including both a modem and modem channel bank converter.

For a variety of reasons, however, the customer may still need to terminate at least one end of a DS-0 channel with a modem. One problem with this is, of course, that the modem typically operates at 9,600 samples per second, whereas each DS-0-formatted channel of the T1 channel bank operates at 8,000 samples per second.

Prior art arrangements have been devised to convert the 9,600 Hz modem samples to 8,000 Hz channel bank samples. One such prior art arrangement utilizes series-connected converter units. In this arrangement, the modem 9,600 Hz digital samples are first processed by a digital-to-analog (hereinafter "D/A") converter to convert the modem samples to analog form. Once converted to analog form, the modem signal is then processed by an analog-to-digital (hereinafter "A/D") converter to re-convert the modem signal back to a digital form, comprising 8,000 Hz samples. Once converted to 8,000 Hz digital samples, this resulting signal is finally applied to the channel bank.

The problem with this prior art arrangement is the signal-to-noise level of the information signal is impaired by the series-connected converter units. Such an impairment can be significant, in view of the fact that a typical converter, with its required analog circuitry, adds approximately 1.0 dB of noise to the processed signal.

As a result, there is a need for a converter to directly convert modem samples to T1 channel bank samples, where the modem and the channel bank are operating at different frequencies.

SUMMARY OF THE INVENTION

A modem-channel bank converter including a transmit circuit and a receive circuit is disclosed. The transmit circuit includes a transmit interpolator and a control unit, the transmit interpolator having an input, an output, and a predetermined number (M) of selectable finite impulse response ("FIR") filters controlled by the control unit, the transmit circuit having an input coupled to the transmit interpolator input, and an output coupled to the transmit interpolator output, the control unit including a modem clock signal of frequency=$f_{modem}$, a channel bank transmit framing signal of frequency=$f_{channel\ bank}$, and a master clock signal of frequency=$f_{master}$. The transmit circuit is arranged for forming a channel bank transmit sample based on a modem transmit sample and a filter selection index (j) in accordance with predetermined method, comprising the following steps:

(a) upon receiving a modem clock signal, apply a modem transmit sample to the transmit interpolator input, and determine a first master clock reading;

(b) upon receiving a channel bank transmit framing signal, determine a second master clock reading;

(c) compute a master clock reading transmit difference ($D_t$) based on the second master clock reading minus the first master clock reading;

(d) determine j based on $D_t$; and, (e) provide a channel bank transmit sample based on the transmit interpolator output.

The receive circuit is similar to the transmit circuit, and operates to form a modem receive sample based on a channel bank receive sample.

BRIEF DESCRIPTION OF THE DRAWINGS

FIG. 3 shows a first flow diagram for the first embodiment.

FIG. 4 shows a second flow diagram for the first embodiment.

DETAILED DESCRIPTION

Figure 1:
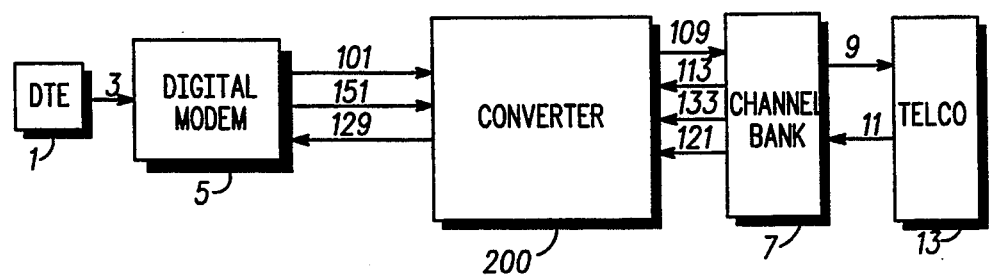
FIG. 1 is a block diagram that shows a first embodiment of a modem-channel bank converter, in accordance with the present invention.

FIG. 1 shows a first embodiment of a modem-channel bank converter 200, in accordance with the present invention. There is shown a user data terminal equipment ("DTE") 1 coupled to a modem 5 via an RS-232 interlace 3. The modem, in turn, is arranged to transmit signals to a T1 channel bank 7, and also to receive signals from the channel bank 7 by means of the converter 200. The modem 5 may be, for example, a V.32-type. The channel bank 7, in turn, is coupled to the telephone company network (designated "TELCO") by the duplex T1 channels 9 and 11.

The transmit signal flow is described first. The DTE 1 generates data signals which are presented to the modem via the RS-232 interface. The modem, in turn, forms a sampled-data stream 101 at a predetermined sampling rate. The sampled data stream 101 is a sequence of numerical values in digital form occurring at, for example, 9,600 samples per second. At the 9,600 samples per second rate, the time difference between samples is 104.16 microsecond. These sampled data values are clocked to the converter 200 by the modem clock signal 151.

As will be described below, the converter 200 converts the input samples 101 at the modem frequency rate of 9,600 Hz to corresponding output samples at the channel bank frequency rate of 8,000 Hz. These output samples are presented to the channel bank 7 over the channel 109, and clocked by the channel bank transmit framing signal 113. The channel bank 7, in turn, multiplexes these input data samples 109 to form an aggregate T1 signal 9 at an aggregate rate of 1,544,000 bits/second ("1.544 Mbps"). The resulting T1 signal 9 is then presented to the TELCO 13 for ultimate transmission to one or more remote sites (not shown).

The receive signal flow is now described. The TELCO 13 delivers a T1 signal 11 at 1.544 Mbps to the channel bank 7. The channel bank 7, in turn, de-multiplexes the aggregate signal 11 to form an individual receive channel at 64 Kbps. This channel thus comprises a stream of 8-bit samples at a rate of 8,000 samples/second. These samples are applied to the converter 200 via the channel 121, and clocked by the channel bank receive framing signal 133.

As will be described below, the converter 200 thus converts the channel bank receive samples 121 at the channel bank frequency of 8,000 Hz to modem samples at the modem frequency of 9,600 Hz. These modem samples are applied to the modem 5 via channel 129, and clocked by the modem clock 151. The modem 5, in turn, converts the received samples 129 into receive data, which is applied to the DTE 1 via the RS-232 interface 3.

Figure 2:
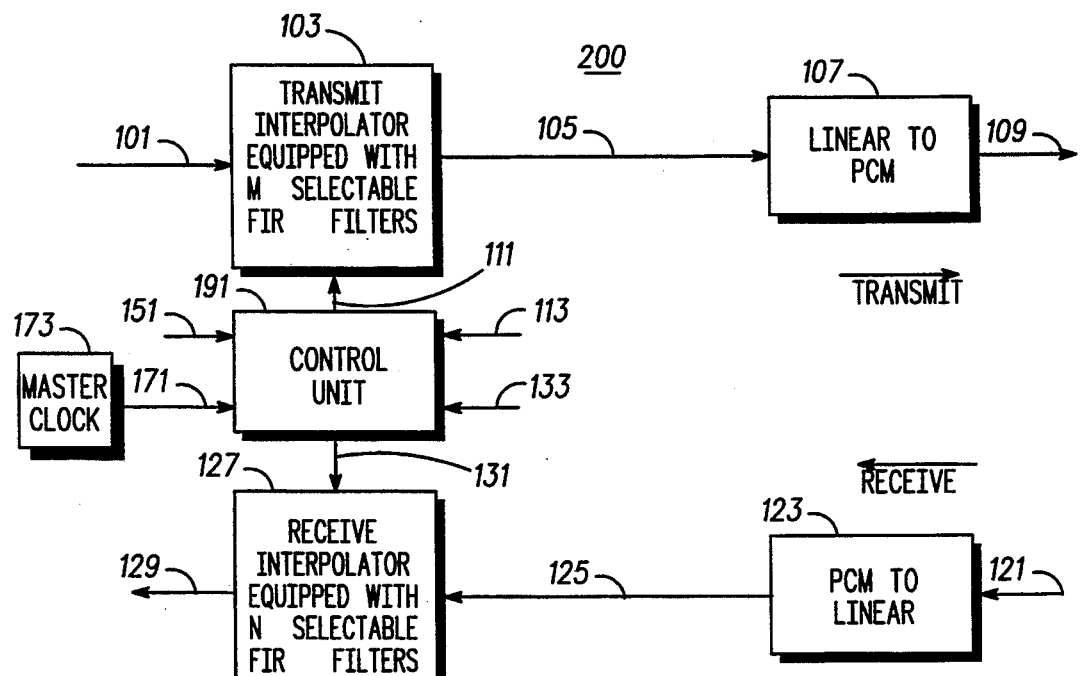
FIG. 2 shows further detail of the first embodiment.

FIG. 2 shows further detail for the converter 200. As shown therein, the converter includes a transmit circuit comprising a transmit interpolator 103 and a linear-to-PCM converter 107, a receive circuit comprising a PCM-to-linear converter 123 and a receive interpolator 127, and a common control unit 191.

The transmit circuit will be described first. The transmit interpolator 103 is a Newton's Method type, implemented as an FIR filter, with a predetermined number, defined as M, of selectable FIR filters being available. At any given time, any filter can be selected by the parameter j ("j"), from 1 to M. For example, the transmit interpolator 103 may have, for instance, 70 sets of filter coefficients. In this case, M would equal 70.

The control unit 191 is coupled to the transmit interpolator 103 via channel 111, and arranged to control the value of j. The control unit 191 includes a modem clock signal 151, which operates at the modem frequency ("$f_{modem}$"), a master clock signal 171, which operates at a master frequency ("$f_{master}$"), a channel bank transmit framing signal 113, and a channel bank receive framing signal 133, both operating substantially at the channel bank frequency ("$f_{channel\ bank}$"). The master clock signal 171 is derived from a master interpolator clock 173. The clock 173 is arranged to deliver timing signals 171 to the control unit 191 in the form of clock readings at a rate equal to $f_{master}$. In one example, for instance, $f_{master}$ may be 672 KHz, and the clock readings may, for instance, vary from 0 to 999,999,999, using base 10. Other arrangements are, of course, possible.

As shown, a modem transmit sampled data stream 101 is input to the transmit interpolator 103 which, after processing, applies it to the linear-to-PCM converter 107 via the path 105. The linear-to-PCM converter 107, in turn, forms a channel bank transmit sample 109 for delivery to the channel bank 7.

Thus, the sampled data stream 101 may be viewed as the transmit circuit's input, and signal point 109 may be viewed as the transmit circuit's output The receive circuit will now be described. The receive interpolator 127 is a Newton's Method type, implemented as an FIR filter, with a predetermined number, defined as N, of filters available. At any given time, any filter can be selected by the parameter k ("k"), which has values from 1 to N. For example, the receive interpolator 127 may have, for instance, 84 sets of filter coefficients. In this case, N would equal 84.

Similar to above, the control unit 191 is coupled to the receive interpolator 127 via channel 131, and arranged to control the value of k.

As shown, the channel bank receive sample 121 is input to the PCM-to-linear converter 123 which, after processing, applies it to the receive interpolator 127 via the path 125. The receive interpolator 127, in turn, forms a modem receive sample data stream 129 for delivery to the modem 5.

Thus, signal point 121 may be viewed as the receive circuit's input, and signal point 129 may be viewed as the receive circuit's output.

Those skilled in the art will appreciate that a suitably-programmed 77C25-type Digital Signal Processor ("DSP"), available from NEC, may be used, for example, to implement the transmit interpolator 103, the linear-to-PCM converter 107, the PCM-to-linear converter 123, and the receive interpolator 127. Likewise, those skilled in the art will appreciate that a suitably-programmed 8031 microcontroller, available from Intel, may be used, for example, to implement the control unit 191 to provide system control functions and to respond to system interrupts based on the channel bank framing signals 113, 133, and the modem clock signal 151. The PCM conversions provided by the converters 107 and 123 are in accordance with the CCITT standard G.711.

FIG. 3 shows a flow diagram 300 for the transmit circuit of the converter 200, as depicted in FIG. 2. Referring now to FIG. 3, the process starts, step 301, and then goes to step 303, where it waits to receive a modem clock signal 151. If none is received within a predetermined period of time, the process goes to step 311, where it waits to receive a channel bank transmit framing signal 113. If none is received within a predetermined period of time, the process returns to step 303.

Thus, a check is continually made of the modem clock signal 151 and the channel bank transmit framing signal 113. If either is received, then the master clock time signal 171 is read and its value stored as a parameter. As described below, if the modem clock signal 151 is received, then the master clock signal 171 is read and stored as a first count value, designated as the parameter "A"; further, if the channel bank transmit framing signal 113 is received, then the master clock signal 171 is read and stored as a second count value, designated as the parameter "B".

Returning now to step 303, when a modem clock signal 151 is received, the process goes to step 305, where the modem transmit sampled data signal is read. The modem transmit sampled data signal corresponds to signal 101 in FIG. 2. The process then goes to step 307, where it stores the sampled data signal 101 into the transmit interpolator memory. The process then goes to step 309, where the master clock is read and stored as the value A.

The process then goes to step 311, where it waits a predetermined time to receive a channel bank transmit framing signal 113. If a transmit framing signal 113 is not received, the process returns to step 303 to wait for the next modem clock signal 151. But if a transmit framing signal is received, the process goes to step 313.

In step 313, the process determines a second master clock reading, which is then stored as the value B. The process then goes to step 315, where it determines the transmit time difference, $D_t$, by subtracting A from B, thus $D_t = B - A$.

The process then goes to step 317, where the transmit filter selection index (j) is determined using the formula $$j = \frac{D_t \times M \times f_{modem}}{f_{master}},$$

where M is a predetermined constant and $f_{modem}$ is the modem clock frequency and $f_{master}$ is the master clock frequency.

The process then goes to step 319, where the filter selection index j is used to select the appropriate FIR filter coefficients. These coefficients and the stored sampled transmit signals 101 from step 307 are then used as an input to the interpolating FIR filter. The output of the interpolating FIR filter is then calculated based on the transmit samples and coefficients selected by the index j. The FIR filter output corresponds to signal 105 in FIG. 2.

The process then goes to step 321, where the interpolating FIR filter output 105 from step 319 is converted to a PCM signal.

The process then goes to step 323, where the PCM signal from step 321 is sent as a transmit sample to the T1 channel bank. This transmit sample corresponds to signal 109 in FIG. 2.

Step 325 forces a return to step 301 where the process repeats.

In one embodiment, adjusting the master clock 173 so that $f_{master}$ equals $M \times f_{modem}$ yields the advantageous result that $j = D_t$. Thus, the coefficient selection index j may be determined as equal to the master clock reading transmit difference, $D_t$. In the preferred embodiment, M=70, $f_{modem}$=9,600 Hz, and $f_{master}$=672,000 Hz.

FIG. 4 shows a flow diagram 400 for the receive circuit of converter 200, as depicted in FIG. 2. The process starts, step 401, and then goes to step 403, where it waits to receive a channel bank receive framing signal 133. If none is received within a predetermined period of time, the process goes to step 413, where it waits to receive a modem receive clock signal 151. If none is received within a predetermined period of time, the process returns to step 403.

Thus, a check is continually made of the channel bank receive framing signal 133 and the modem receive clock signal 151. If either is received, then the master clock time 171 is read and its value stored as a parameter. As described below, if the channel bank receive framing signal 133 is received, then the master clock signal 171 is read and stored as a first count value, designated as the parameter "X"; further, if the modem clock signal 151 is received, then the master clock signal 171 is read and stored as a second count value, designated as the parameter "Y".

Returning now to step 403, when a channel bank receive framing signal 133 is received, the process goes to step 405, where the PCM signal is read from the channel bank. The PCM signal corresponds to signal 121 in FIG. 2. The process then goes to step 407, where the PCM signal 121 is converted to a receive sample value, corresponding to signal 125 in FIG. 2.

The process then goes to step 409, where the converted value 125 is shifted into the interpolator.

The process then goes to step 411, where the master clock is read and stored as X.

The process then goes to step 413, where it waits a predetermined time to receive a modem receive clock signal 151. If a modem clock signal 151 is not received, the process returns to step 403 to wait for the next channel bank receive framing signal 133. But if a modem clock signal 151 is received, the process goes to step 415.

In step 415, the process determines a second master clock reading, which is then stored as the value Y. The process then goes to step 417, where it determines the receive time difference, $D_r$, by subtracting X from Y, thus $D_r = Y - X$.

The process then goes to step 419, where it determines the receive filter selection index k using the formula $$k = \frac{D_r \times N \times f_{channel\ bank}}{f_{master}},$$

where N is a predetermined constant, $f_{channel\ bank}$ is the channel bank clock frequency, and $f_{master}$ is the master clock frequency.

The process then goes to step 421, where the index k from step 419 is used to select the appropriate FIR filter coefficients. These coefficients and the stored converted value 125 from step 411 are then used as an input to the interpolating FIR filter. The interpolating FIR filter output is then calculated based on the converted value and the FIR filter coefficients selected by the index k.

The process then goes to step 423, where the interpolating FIR filter output from step 421 is sent to the modem. This FIR filter output corresponds to signal 129 in FIG. 2. Step 425 forces a return to step 401, where the process repeats.

In one embodiment, adjusting the master clock 173 so that $f_{master}$ equals $N \times f_{modem}$ yields the advantageous result that $k = D_r$. Thus, the coefficient selection index k may be determined as equal to the master clock reading transmit difference, $D_r$. In the preferred embodiment, $N=84$, $f_{channel\ bank}=8000$ Hz, and $f_{master}=672,000$ Hz.

As described above, a modem-channel bank converter, in accordance with the present invention, incorporates an interpolation scheme that provides sampled data streams at the correct sampling rates and in the correct data formats for both the modem and the channel bank.

In the preferred embodiment, the timing hardware is driven by a master interpolator clock, which is set at an integral multiple of the modem and channel bank sample clocks. The master clock drives a counter, the value of which is latched on the edge of each clock signal. The sample clock signals may be synchronized to the master clock using flip-flop units to avoid the possibility of latching the counter value incorrectly during a transition. These latched counter values provide a time based used to select the correct interpolator tap value.

In the preferred embodiment, the interpolators 103 and 127 are 11th order Newton's Method interpolators. This type of interpolator may be implemented, for instance, as an Finite Impulse Response filters with variable coefficients. See, for example, F. B. Hildebrand, "Introduction to Numerical Analysis," McGraw-Hill, New York, N.Y., 1956. See also, A. V. Oppenheim and R. W. Schafer, "Digital Signal Processing," Prentice-Hall, Englewood Cliffs, N.J., 1975. Thus, the values of the coefficients are computed based on the time delay between the incoming samples and the desired output samples. Since the measured time difference between samples corresponds to an integral number of master clock cycles, there are a fixed number of required interpolator coefficient sets. For the transmit circuit, the master clock rate is $70 \times 9,600$, so 70 sets of coefficients are required to convert from the modem's 9,600 samples/second to the channel bank's 8,000 samples/second. For the receive circuit, the master clock rate is $84 \times 8,000$, so 84 sets of coefficients are required to convert from the channel bank's 8,000 samples/second to the modem's 9,600 samples/second. These sets of coefficients may be calculated in advance and stored in Read Only Memory. The control unit's microcontroller may thus select the appropriate coefficient table by simply reading the timer count for the output interrupt and subtracting the timer count for the last time through the input interrupt.

Thus, a modem-channel bank converter, in accordance with the present invention, provides for the coordination of two sampling frequencies, that is, the sampling frequency of the modem and the sampling frequency of the T1 channel bank.

One advantage of a modem-channel bank converter, in accordance with the present invention, as depicted in FIG. 2, is that it eliminates the need for the series-connected D/A and A/D converters, as in the prior art. In addition to the savings in electrical components and printed-circuit board space, the quality of the information signal is substantially improved, as the signal is no longer required to be processed by two back-to-back converters. Moreover, it is conservatively estimated that this typically yields an improved signal to noise ratio of at least 1.0 dB, together with a corresponding improvement in the bit error ratio.

While various embodiments of a modem-channel bank converter, according to the present invention, have been described hereinabove, the scope of the invention is defined by the following claims.

What is claim is:

1. A modem-channel bank converter
   having a transmit circuit comprising a transmit interpolator and a control unit,
   the transmit interpolator having a transmit interpolator input, a transmit interpolator output, the transmit interpolator further having a predetermined number (M) of selectable finite impulse response filters controlled by the control unit,
   the transmit circuit having a transmit circuit input coupled to the transmit interpolator input, the transmit circuit further having a transmit circuit output coupled to the transmit interpolator output,
   the control unit receiving a modem clock signal of frequency $=f_{modem}$, a channel bank transmit framing signal of frequency $32\ f_{channel\ bank}$, and a master clock signal of frequency $=f_{master}$,
   the transmit circuit arranged for forming a channel bank transmit sample on a modem transmit sample and a selected tap value (j) in accordance with a predetermined method, the predetermined method comprising the following steps:
   (a) upon receiving the modem clock signal, applying the modem transmit sample to the transmit interpolator input, and determining a first master clock reading;
   (b) upon receiving the channel bank transmit framing signal, determining a second master clock reading;
   (c) computing a master clock reading transmit difference ($D_t$) based on the second master clock reading minus the first master clock reading;
   (d) determining j based on $D_t$; and,
   (e) providing the channel bank transmit sample based on the transmit interpolator output,
   where j is directly proportional to $D_t$, and where:
   j = the selected tap value,
   $D_t$ = the master clock reading difference; and,
   M = the predetermined number of selectable finite impulse responses filters.

2. The modem-channel bank converter of claim 1, where j is based on:

$$\frac{D_t \times M \times f_{modem}}{f_{master}}.$$

3. The modem-channel bank converter of claim 2, where $f_{master} = M \times f_{modem}$ and $j = D_t$.

4. The modem-channel bank converter of claim 3, where the transmit interpolator is a Newton's Method interpolator.

5. The modem-channel bank converter of claim 4, further having a linear-to-pulse code modulation converter coupled in series between the transmit interpolator output and the transmit circuit output.

6. The modem-channel bank converter of claim 5, where $M=70$, $f_{modem}=9,600$ Hz, and $f_{master}=672,000$ Hz.

7. A modem-channel bank converter having a receive circuit comprising a receive interpolator and a control unit,
   the receive interpolator having a receive interpolator input, a receive interpolator output, the receive interpolator further having a predetermined number (N) of selectable finite impulse response filters controlled by the control unit, the receive circuit having a receive circuit input coupled to the receive interpolator input, the receive circuit further having a receive circuit output coupled to the receive interpolator output, the control unit receiving a modem clock signal of frequency=$f_{modem}$, a channel bank receive framing signal of frequency=$f_{channel\ bank}$, and a master clock signal of frequency=$f_{master}$, the receive circuit arranged for forming a modem receive sample based on a channel bank receive sample and a selected tap value (k) in accordance with a predetermined method, the predetermined method comprising the following steps:

(a) upon receiving the channel bank receive framing signal, applying the channel bank receive sample to the receive interpolator input, and determining a first master clock reading;

(b) upon receiving a modem sample clock signal, determining a second master clock reading;

(c) computing a master clock reading receive difference ($D_r$) based on the second master clock reading minus the first master clock reading;

(d) determining k based on $D_r$; and, (e) providing the modem receive sample based on the receive interpolator output, where k is directly proportional to $D_r$, and where:
k=the selected tap value,
$D_r$=the master clock reading difference; and,
N=the predetermined number of selectable finite impulse response filters.

8. The modem-channel bank converter of claim 7, where k is based on:

$$\frac{D_r \times N \times f_{channel\ bank}}{f_{master}}.$$

9. The modem-channel bank converter of claim 8, where $f_{master}$=N×$f_{channel\ bank}$ and k=$D_r$.

10. The modem-channel bank converter of claim 9, where the receive interpolator is a Newton's Method interpolator.

11. The modem-channel bank converter of claim 10, further having a pulse code modulation-to-linear converter coupled in series between the receive circuit input and the receive interpolator input.

12. The modem-channel bank converter of claim 11, where N=84, $f_{channel\ bank}$=8,000 Hz, and $f_{master}$=672,000 Hz.

13. In a modem-channel bank converter having a transmit circuit comprising a transmit interpolator and a control unit, the transmit interpolator having a transmit interpolator input, a transmit interpolator output, the transmit interpolator further having a predetermined number (M) of selectable finite impulse response filters controlled by the control unit, the transmit circuit having a transmit circuit input coupled to the transmit interpolator input, the transmit circuit further having a transmit circuit output coupled to the transmit interpolator output, the control unit receiving a modem clock signal of frequency=$f_{modem}$, a channel bank transmit framing signal of frequency=$f_{channel\ bank}$, and a master clock signal of frequency=$f_{master}$, a method for forming a channel bank transmit sample based on a modem transmit sample and a selected tap value (j), the method comprising the following steps:

(a) upon receiving the modem clock signal, applying the modem transmit sample to the transmit interpolator input, and determining a first master clock reading;

(b) upon receiving the channel bank transmit framing signal, determining a second master clock reading;

(c) computing a master clock reading transmit difference ($D_t$) based on the second master clock reading minus the first master clock reading;

(d) determining j based on $D_t$; and, (e) providing the channel bank transmit sample based on the transmit interpolator output, where j is directly, proportional to $D_t$, and where:
j=the selected tap value,
$D_t$=the master clock reading difference; and,
M=the predetermined number of selectable finite impulse response filters, 14. The method of claim 13, where j is based on:

$$\frac{D_t \times M \times f_{modem}}{f_{master}}.$$

15. The method of claim 14, where $f_{master}$=M×$f_{modem}$ and j =$D_t$.

16. The method of claim 15, where the transmit interpolator is a Newton's Method interpolator.

17. The method of claim 16, further having a linear-to-pulse code modulation converter coupled in series between the transmit interpolator output and the transmit circuit output.

18. The method of claim 17, where M=70, $f_{modem}$=9,600 Hz, and $f_{master}$=672,000 Hz.

19. In a modem-channel bank converter having a receive circuit comprising a receive interpolator and a control unit, the receive interpolator having a receive interpolator input, a receive interpolator output, the receive interpolator further having a predetermined number (N) of selectable finite impulse response filters controlled by the control unit, the receive circuit having a receive circuit input coupled to the receive interpolator input, the receive circuit further having a receive circuit output coupled to the receive interpolator output, the control unit receiving a modem clock signal of frequency=$f_{modem}$, a channel bank receive framing signal of frequency=$f_{channel\ bank}$, and a master clock signal of frequency=$f_{master}$, a method for forming a modem receive sample based on a channel bank receive sample and a selected tap value (k), the method comprising the following steps:

(a) upon receiving the channel bank receive framing signal, applying the channel bank receive sample to the receive interpolator input, and determining a first master clock reading;

(b) upon receiving the modem sample clock signal, determining a second master clock reading;

(c) computing a master clock reading receive difference ($D_r$) based on the second master clock reading minus the first master clock reading;

(d) determining k based on $D_r$; and, (e) providing the modem receive sample based on the receive interpolator where k is directly proportional to $D_r$, and where:

k = the selected tap value, $D_r$ = the master clock reading difference; and,

N = the predetermined number of selectable finite impulse response filters.

20. The method of claim 19, where k is based on:

$$\frac{D_r \times N \times f_{channel\ bank}}{f_{master}}.$$

21. The method of claim 20, where $f_{master} = N \times f_{channel\ bank}$ and $k = D_r$.

22. The method of claim 21, where the receive interpolator is a Newton's Method interpolator.

23. The method of claim 22, further having a pulse code modulation-to-linear converter coupled in series between the receive circuit input and the receive, interpolator input.

24. The method of claim 23, where N = 84, $f_{channel\ bank}$ = 8,000 Hz, and $f_{master}$ = 672,000 Hz.

* * * * *

UNITED STATES PATENT AND TRADEMARK OFFICE
CERTIFICATE OF CORRECTION

PATENT NO. : 5,365,545

DATED : November 15, 1994

INVENTOR(S) : Steven R. Blackwell and Michael D. Fanning

It is certified that error appears in the above-identified patent and that said Letters Patent is hereby corrected as shown below:

At column 8, line 20, "frequency 32 f" should be --frequency = f--.

At column 8, line 23, "sample on" should be --sample based on--.

At column 11, line 4, "receive interpolator" should be --receive interpolator output,--.

At column 12, line 11, "receive, interpolator" should be --receive interpolator--.

Signed and Sealed this

Thirty-first Day of January, 1995

*Attest:*

BRUCE LEHMAN

*Attesting Officer*   *Commissioner of Patents and Trademarks*